United States Patent
Scarpa

(10) Patent No.: US 8,457,037 B2
(45) Date of Patent: Jun. 4, 2013

(54) METHOD TO MINIMIZE INTERFERENCE INTO LEGACY SDARS RECEPTION BY VARYING OVERLAY MODULATION AS A FUNCTION OF SATELLITE POSITION

(75) Inventor: Carl Scarpa, Plainsboro, NJ (US)

(73) Assignee: Sirius XM Radio Inc., New York, NY (US)

( * ) Notice: Subject to any disclaimer, the term of this patent is extended or adjusted under 35 U.S.C. 154(b) by 899 days.

(21) Appl. No.: 12/497,339

(22) Filed: Jul. 2, 2009

(65) Prior Publication Data

US 2010/0008289 A1 Jan. 14, 2010

Related U.S. Application Data

(60) Provisional application No. 61/077,742, filed on Jul. 2, 2008, provisional application No. 61/079,349, filed on Jul. 9, 2008.

(51) Int. Cl.
*H04B 7/185* (2006.01)
(52) U.S. Cl.
USPC ............ 370/317; 370/316; 370/318; 370/322
(58) Field of Classification Search
USPC ....................................................... 370/317
See application file for complete search history.

(56) References Cited

U.S. PATENT DOCUMENTS

| | | | |
|---|---|---|---|
| 3,755,816 A * | 8/1973 | Kratzer | 342/458 |
| 4,876,737 A * | 10/1989 | Woodworth et al. | 455/12.1 |
| 7,215,713 B2 | 5/2007 | Walker et al. | |
| 7,280,613 B2 | 10/2007 | Walker et al. | |
| 2005/0111581 A1* | 5/2005 | Walker et al. | 375/308 |
| 2006/0171449 A1* | 8/2006 | Lindoff et al. | 375/148 |
| 2007/0076788 A1 | 4/2007 | Jia et al. | |
| 2007/0286238 A1* | 12/2007 | Wang et al. | 370/478 |
| 2008/0225995 A1* | 9/2008 | Auranen et al. | 375/344 |
| 2009/0154613 A1* | 6/2009 | Lai | 375/344 |

OTHER PUBLICATIONS

International Search Report and Written Opinion of the International Searching Authority, issued for corresponding PCT Application No. PCT/US2009/049598 dated Aug. 26, 2009.

* cited by examiner

*Primary Examiner* — Hassan Phillips
*Assistant Examiner* — Anez Ebrahim
(74) *Attorney, Agent, or Firm* — Kramer Levin Naftalis & Frankel LLP

(57) ABSTRACT

Degree of hierarchical modulation can be varied as a function of satellite position, where such hierarchical modulation can be a combination of phase and amplitude shifts. As each satellite in a multiple satellite system moves towards a D-node or an A-node position, the offset angle of a phase-based hierarchical modulation scheme can be varied. Starting with the lowest satellite position in the sky an offset angle for overlay bits can progressively increase as the position of the satellite in the sky increases. At a satellite's highest point in the sky, the overlay offset angle can be at its maximum. The value of a varying overlay offset angle (for each satellite) can be embedded in an Overlay Identification Marker (OIM) in the broadcast. The receiver can then appropriately correct MRC weightings (weighting more heavily the (higher lying) satellite).

13 Claims, No Drawings

METHOD TO MINIMIZE INTERFERENCE INTO LEGACY SDARS RECEPTION BY VARYING OVERLAY MODULATION AS A FUNCTION OF SATELLITE POSITION

CROSS-REFERENCE TO RELATED APPLICATIONS

This application claims the benefit of U.S. Provisional Patent Application Nos. 61/077,742 and 61/079,349, each entitled "METHOD TO MINIMIZE INTERFERENCE INTO LEGACY SDARS RECEPTION BY VARYING OVERLAY MODULATION AS A FUNCTION OF SATELLITE POSITION", and filed on Jul. 2, 2008 and Jul. 9, 2008, respectively, the specifications of which are hereby incorporated herein by reference.

TECHNICAL FIELD

The present invention relates to satellite broadcast communications, and more particularly to methods and systems for minimizing interference into legacy signal reception by varying overlay modulation as a function of satellite position.

BACKGROUND OF THE INVENTION

In certain broadcast communications systems, such as, for example, satellite radio, in order to optimize the utilization of a fixed bandwidth, hierarchical modulation ("HM") can be used to overlay data for new services on top of a legacy transmission, Such a scheme can be used, for example, to offer additional channels or services. For example, in the Sirius XM Radio Inc. ("Sirius") Satellite Digital Audio Radio Service ("SDARS"), video channels can be sent over existing audio channels via such an overlay modulation scheme, where the video signal is sent in a "Layer 2" or overlay modulation layer. Similarly, such Layer 2 data can be used for other types of content, such as data, traffic, etc.

Additionally, it is well known in the SDARS community that signal reception for polar orbiting satellites is a function of satellite position in the sky. As a satellite approaches its lowest position in the sky, the reception is poorest, and conversely, it is best when the satellite is at it highest position in the sky. This has been a limiting factor in satellite radio broadcasting systems from their outset. Unfortunately, this problem is not easily rectified, which, ultimately, along with many other factors, can limit the overall throughput of such broadcast satellite services.

Sending overlay bits, such as for a video service, for example, compounds this problem, as these bits appear as noise to a legacy receiver (i.e., a standard SDARS receiver not demodulating the overlay layer modulation prior to passing the received signal to a legacy signal demodulator). For example, the Sirius Backseat TV™ video service has been implemented by hierarchically modulating the original (i.e., legacy audio) Sirius QPSK symbol constellation with video data.

As noted, hierarchical modulation, also known as overlay modulation, appears as a noise-like source to legacy receivers, precisely because it further modulates the legacy symbols transmitted such that two symbols having the same legacy bit values generally appear in a different portion of the IQ plane. An additional noise source is un-welcome in any scenario and in the context of satellite radio is simply a consequence to pay if additional bandwidth is to be claimed from an SDARS system.

Fortunately, the additional noise source due to overlay modulation is essentially unnoticeable to legacy receivers for most of the positions of a broadcast satellite in the sky. It is only when a satellite is lowest in the sky (for example, at what are known as Ascending A-node and Descending D-node times, when a satellite's ground track crosses the equator, for a satellite receiver located in North America) that the additional noise-like source due to overlay modulation can cause the most harm to legacy receivers. Such harm is generally manifested as additional mute seconds (FEC coding failure) during the A-node and D-node positions/times of the satellite. Thus, what is needed in the art are systems and methods that can minimize the harmful effects of overlay modulation on legacy receivers as a broadcast satellite approaches points in the sky where reception of its signal is at a minimum.

SUMMARY OF THE INVENTION

In exemplary embodiments of the present invention, a degree of hierarchical modulation can be varied as a function of satellite position, which can be related to time of day, and where such hierarchical modulation can be a combination of phase and amplitude shifts. In exemplary embodiments of the present invention, as each satellite in a multiple satellite system broadcasting to North America moves towards a D-node or an A-node position, the offset angle of a phase-based hierarchical modulation scheme can be varied. Thus, in exemplary embodiments of the present invention, the lowest satellite position in the sky can have the lowest offset angle for overlay bits, which offset angle can, for example, progressively increase as the position of the satellite in the sky increases. At a satellite's highest point in the sky, the overlay offset angle can, for example, thus be at its maximum. To aid a receiver to receive such varying overlay modulated data, the value of a varying overlay offset angle (for each satellite) can be embedded in an Overlay Identification Marker (OIM) in the bit stream broadcast by that satellite. In exemplary embodiments of the present invention each satellite broadcast receiver can thus decode each satellite's signal, knowing its respective instantaneous overlay offset angle. The receiver can then use this information to appropriately correct MRC weightings (weighting more heavily the (higher lying) satellite with the higher degree of Layer 2 modulation) before it is MRC combined across various received signal streams. Similar methods can be implemented for other overlay modulation techniques, and the method can be extended to a broadcast system using N satellites, each having a varying degree of Layer 2 modulation.

DETAILED DESCRIPTION OF THE INVENTION

In general, the present invention can be applied to any communications system which employs the use of hierarchical modulation to transmit secondary or "Layer 2" information. For example, in order to support future services within an original system design (i.e., a "legacy system"), additional information bandwidth can be acquired by using hierarchical modulation to overlay data for new services on top of the legacy transmission. As noted, in a broadcast satellite network, such as, for example, that of Sirius XM Radio Inc., such overlay data can, for example, be transmitted by applying a programmable angular offset to legacy QPSK symbols, thus forming, for example, a new constellation similar to 8PSK. A description of such an exemplary hierarchical modulation scheme is described in U.S. Published Patent Application No. US 2009/0097592, Ser. No. 12/079,782, entitled "HIERARCHICAL OFFSET COMPENSATION TO IMPROVE SYN- CHRONIZATION AND PERFORMANCE", the disclosure of which is hereby incorporated herein by reference. Other methods of hierarchical modulation, involving further modulating amplitude, or some defined combination of modulation of both amplitude and phase, can also, for example, be used.

For ease of description, in what follows an exemplary embodiment of the present invention in which legacy QPSK symbols are modulated with Layer 2 information by increasing or decreasing the phase angular offset of such legacy symbols will be described. It is understood that various other known methods of hierarchical modulation are also contemplated and fully within the techniques of the present invention.

In exemplary embodiments of the present invention the degree of hierarchical modulation can be varied as a function of satellite position in the sky, which can be related to time of day. This is because the transit of each satellite throughout the day, and thus its altitude as a function of time, can be a prion known. In exemplary embodiments of the present invention, for a satellite communications system broadcasting to North America, as each satellite moves towards a D-node or an A-node position, the offset angle used in the overlay modulation of its signal can be varied. Thus, in exemplary embodiments of the present invention, a lowest-in-the-sky satellite position can have the lowest offset angle for the overlay bits which it sends, and said offset angle can, for example, progressively increase as the position of the satellite increases in the sky. At the satellite's highest point in the sky, the offset angle can, for example, thus be at its maximum. Thus, in exemplary embodiments of the present invention, the higher in the sky satellite can have a significantly larger offset angle than the lower in the sky satellite, while still having the least degradation of the legacy signal due to the overlay modulation.

To aid the receivers, the value of the then current offset angle (for each satellite) can, for example, be embedded in an Overlay Identification Marker (OIM) in the broadcast data stream, such as, for example, in a service channel, thus allowing the overlay modulation layer to be accurately decoded. Alternatively, the OIM could be part of the overlay bit stream, or even the legacy bit stream, for example. A description of an exemplary OIM is described in U.S. Published Patent Application No. US 2009/0168809, Ser. No. 12/183,980, entitled "METHOD AND APPARATUS TO JOINTLY SYNCHRONIZE A LEGACY SDARS SIGNAL WITH OVERLAY MODULATION", the disclosure of which is hereby incorporated herein by reference. (See FIG. 1, where the OIM appears at the end of a legacy transmission frame).

In exemplary embodiments of the present invention, each receiver can thus decode each satellite's signal (or, for example, in a satellite broadcast system where some satellites vary overlay modulation and some do not, the signal of each of those satellites that does utilize a varying overlay value), and determine its respective instantaneous overlay offset angle (or, for example, its combination of offset angle and amplitude modulation, for example, in an overlay system utilizing both amplitude and phase overlay-modulation). The receiver can then use this information to appropriately correct the MRC combining weightings for each satellite's signal as a function of its Layer 2 offset angle before it is MRC combined across signal streams.

In exemplary embodiments of the present invention, in a satellite broadcast system using two satellites each utilizing varying overlay modulation as a function of satellite position being received at an exemplary receiver, an exemplary MRC combining correction factor based on the different offset angles used in each satellite's Layer 2 modulation scheme can utilize a relationship as next described. First, it is noted that the following provides a classical MRC combining rule where sigma(N) is the noise power of satellite number N (for example where N=2):

$$W1=Sigma2/(sigma1+sigma2); \text{ and}$$

$$W2=Sigma1//(sigma1+sigma2).$$

Where N>2, for example, the following two examples illustrate the classical optimal MRC weightings:

The MRC formula for 3 satellites would be:

$$W1=sigma2*sigma3/(sigma1+sigma2+sigma3);$$

$$W2=sigma1*sigma3/(sigma1+sigma2+sigma3); \text{ and}$$

$$W3=sigma1*sigma2/(sigma1+sigma2+sigma3).$$

The MRC formula for 4 satellites would be:

$$W1=sigma2*sigma3*sigma4/(sigma1+sigma2+sigma3+sigma4);$$

$$W2=sigma1*sigma3*sigma4/(sigma1+sigma2+sigma3+sigma4);$$

$$W3=sigma1*sigma2**sigma4/(sigma1+sigma2+sigma3+sigma4); \text{ and}$$

$$W4=sigma1*sigma2**sigma3/(sigma1+sigma2+sigma3+sigma4).$$

Next, in exemplary embodiments of the present invention, these classical MRC weightings need to be corrected for the relative degree of Layer 2 modulation, such as, for example, the difference in Layer 2 offset angle, using correction factors C1 and C2, as follows:

$$W1'=W1*C1$$

$$W2'=W2*C2$$

To determine such relative Layer 2 modulation correction factors C1 and C2, for example, depending on which satellite is then using the larger offset angle, that satellite's correction factor can be set to 1.0. The other satellite's correction factor, for example, can be set according to a formula that reasonably takes into account the relative degree of Layer 2 modulation then existing between the two satellites. Thus, where a given satellite has had its overlay modulation signal diminished so as not to degrade its legacy signal, that satellite's contribution to the overall overlay modulation signal output by the receiver will be appropriately diminished. In exemplary embodiments of the present invention, there are various possible metrics that can be used to capture this relative Layer 2 modulation factor between the satellites. For example, the formula sin(x)/sin(y) can be used, where x is the smaller Layer 2 offset angle, and y is the larger Layer 2 offset angle, of the two satellites. Thus, the correction factor for the satellite with the lower degree of Layer 2 modulation (e.g. the satellite lower-in-the-sky), $C_{lower\ satelite}$, can, for example, be defined as:

$$C_{lower\ satelite}=sin(lower\ offset\ angle)/sin(higher\ offset\ angle).$$

Thus, for example, if Sat1 is lowest in the sky, it has a lower Layer 2 offset angle (to reduce noise in (and degradation of) the legacy signal, as described above). Then Sat will have the higher overlay offset angle, and thus Sat2's correction factor, C2, will be set to 1.0. Sat1's correction factor, C1, can then be set to [sin(offset-angle-sat1)/sin(offset-angle-sat2)], or using exemplary values of 5 degrees overlay phase offset for Sat1, and 10 degrees overlay phase offset for Sat2, C1=sin(5)/sin(10), or C1=0.502, which is a significant relative difference in signal weighting.

As noted, in exemplary embodiments of the present invention, the offset angles then being used for the overlay offset can be derived from examining, for example, the OIM data field (as described above) within the overlay modulated signal from each received bit stream. As also noted, the satellite higher in the sky can have a significantly larger Layer 2 offset angle, and yet the Layer 2 modulation will not significantly degrade reception of the legacy symbols.

In exemplary embodiments of the present invention, after the correction factors are applied to the sliced constellation data, the noise power for the lower lying satellite can, for example, also be scaled by the same factor (for example, 0.502 in the above provided example of 5 and 10 degree offsets for the lower lying and higher lying satellites, respectively). This can ensure, for example, that MRC combining across the various satellites can be performed in an optimal fashion.

For satellite broadcast systems utilizing multiple satellites, and where a given receiver receives more than two satellites at any given time, say N satellites, the exemplary MRC combining correction factors {C1, C2 ... CN} provided above can be appropriately modified to account for the relative offset angles of each of the N satellites. Thus, for example, to develop an exemplary general expression for the relative layer 2 modulation correction factors, we begin with two satellites, Sat1 and Sat2, having Layer 2 offset angles of a1 and a2 respectively, where a2>a1:

$C1=\sin(a1)/[\sin(a1)+\sin(a2)]$; and $C2=\sin(a2)/[\sin(a1)+\sin(a2)]$.

It is noted that this formula is almost the same as the classic MRC rule provided above, but different since here for the correction factors we are using voltage gains, and not noise powers, as in the MRC case.

Taking these formulas, if we normalize by the satellite with the larger angle a2, the correction factors become:

$C2=\sin(a2)/[\sin(a1)+\sin(a2)]/\{\sin(a2)/[\sin(a1)+\sin(a2)]\}=1.0$; and $C1=\sin(a1)/[\sin(a1)+\sin(a2)]/\{\sin(a2)/[\sin(a1)+\sin(a2)]\}=\sin(a1)/\sin(a2)$, as provided above.

Similarly, for 3 satellites the correction factors extend to:

$C1=\sin(a1)/[\sin(a1)+\sin(a2)+\sin(a3)]$;

$C2=\sin(a2)/[\sin(a1)+\sin(a2)+\sin(a2)]$; and $C3=\sin(a3)/[\sin(a1)+\sin(a2)+\sin(a2)]$.

Normalizing, as above, by the correction factor for the largest Layer 2 offset angle (say a2, for example) yields:

$C1=\sin(a1)/\sin(a2)$;

$C2=1.0$; and $C3=\sin(a3)/\sin(a2)$.

The natural extension to N satellites would proceed in an analogous fashion, yielding, for N satellites where ak is the then largest angular offset:

$C1 = \sin(a1)/\sin(ak)$;

$C2 = \sin(a2)/\sin(ak)$;

$\vdots$ $\vdots$, $Ck = 1.0$;

$\vdots$ $\vdots$ $\vdots$ and $CN = \sin(aN)/\sin(ak)$.

In exemplary embodiments of the present invention, varying the layer 2 overlay modulation scheme as a function of satellite position in the sky will greatly reduce legacy signal degradation due to the overlay modulation scheme.

In exemplary embodiments of the present invention an angular offset associated with a layer 2 overlay phase shift can be, for example, between 0 and 22.5 degrees, and a typical exemplary pairs of phase shift values (a) for two satellites, Sat2 nearer to its high point in the sky and Sat1 nearer to its lowest point in the sky is (a1,a2)=10, 15 degrees and (a1,a2)=5, 10 degrees.

In exemplary embodiments of the present invention, after detection of the instantaneous angular offset in an overlay modulation scheme, the overlay angular offset can be removed and the I,Q bit sent on to standard legacy demodulation stages.

What is claimed:

1. A receiver, comprising:
   a first receiving stage to receive a first bit stream of I,Q symbols that have been further modulated with a first varying overlay phase shift;
   a first overlay offset angle detection stage to detect the value of the first offset angle as transmitted;
   a first overlay demodulation stage to detect a direction of the first overlay phase shift; a second receiving stage to receive a second bit stream of I,Q symbols that have been further modulated with a second varying overlay phase shift;
   a second overlay offset angle detection stage to detect the value of the second offset angle as transmitted;
   a second overlay demodulation stage to detect a direction of the second overlay phase shift; and a maximal ratio combining stage that combines the first and second overlay bit streams using the following correction factors to MRC weightings:

$C1=\sin(\text{offset angle Sat1})/\sin(\text{offset angle Sat2})$; and $C2=1.0$;

wherein C1 is the weight for the first overlay bit stream, C2 is the weight for the second overlay bit stream, offset angle Sat1 is the first offset angle as transmitted and offset angle Sat2 is the second offset angle as transmitted, and wherein Sat2>Sat1.

2. The receiver of claim 1, wherein the offset angles are embedded in an Overlay Identification Marker (OIM) within each bit stream.

3. The receiver of claim 2, wherein the overlay offset angle detection stage detects the value of an offset angle by processing the OIM.

4. The receiver of claim 1, wherein after the weight W1 is applied to the first overlay bit stream the noise power for the first satellite can also, for example, be scaled by the same factor.

5. The receiver of claim 1, further comprising a first and a second de-rotation stage to remove a defined angular offset from the received I,Q symbols, wherein each received I,Q symbol is overlay demodulated and de-rotated prior to being input to legacy demodulation stages.

6. The receiver of claim 5, wherein the angular offset associated with each overlay phase shift is between 0 and 22.5 degrees.

7. The receiver of claim 1, wherein N satellites are used, each having a varying amount of layer 2 modulation,
wherein the signals received for the N satellites are combined using maximal ratio combining, where said maximal ratio combining weightings are corrected by a relative layer 2 modulation correction factor,
wherein said layer 2 modulation scheme is a varying angular phase shift aj, for j=1 to N,
wherein said correction factors, for said N satellites are:

$C1=\sin(a1)/\sin(a2), C2=1.0, \ldots, CN=\sin(aN)/\sin(a2),$ and wherein a2 is the then largest angular offset of all N satellites.

8. A program storage device readable by a processing unit, tangibly embodying a program of instructions executable by the processing unit to implement a method of minimizing interference in satellite communications, said method comprising:
receiving a first bit stream of I,Q symbols that have been further modulated with a first varying overlay phase shift;
detecting the value of the first offset angle as transmitted;
detecting a direction of the first overlay phase shift; receiving a second bit stream of I,Q symbols that have been further modulated with a second varying overlay phase shift; detecting the value of the second offset angle as transmitted;
detecting a direction of the second overlay phase shift; and
maximal ratio combining the first and second overlay bit streams using the following relative layer 2 modulation correction factors to MRC weightings:

$C1=\sin(a1)/\sin(a2);$ and $C2=1.0;$ wherein C1 is the correction factor for the first overlay bit stream, C2 is the correction factor for the second overlay bit stream, offset angle a1 is the first offset angle as transmitted and offset angle a2 is the second offset angle as transmitted, and wherein a2>a1.

9. The program storage device of claim 8, further comprising de-rotating each I,Q symbol by its varying overlay phase shift and passing the symbol to legacy decoding stages after said de-rotating.

10. The program storage device of claim 8, wherein N satellites are used, each having a varying amount of layer 2 modulation,
wherein the signals received for the N satellites are combined using maximal ratio combining, where said maximal ratio combining weightings are corrected by a relative layer 2 modulation correction factor,
wherein said layer 2 modulation scheme is a varying angular phase shift aj, for j=1 to N
wherein said correction factors, for said N satellites are:

$C1=\sin(a1)/\sin(a2), C2=1.0, \ldots, CN=\sin(aN)/\sin(a2),$ and wherein a2 is the then largest angular offset of all N satellites.

11. A program storage device readable by a processing unit, tangibly embodying a program of instructions executable by the processing unit to implement a method of minimizing interference in satellite communications, said method comprising:
receiving a first bit stream of I,Q symbols that have been further modulated with a first varying overlay modulation scheme comprising some combination of phase and amplitude shift;
detecting the value of the first overlay modulation as transmitted;
receiving a second bit stream of I,Q symbols that have been further modulated with a second varying overlay modulation scheme;
detecting the value of the second overlay modulation as transmitted; and
maximal ratio combining the first and second overlay bit streams using relative layer 2 modulation correction factors,
wherein said relative layer 2 modulation correction factors to the MRC weightings are:

$C1=\sin(a1)/\sin(a2);$ and $C2=1.0;$ wherein C1 is the correction factor for the first overlay bit stream, C2 is the correction factor for the second overlay bit stream, a1 is a first offset angle as transmitted and a2 is a second offset angle as transmitted, and wherein a2>a1.

12. A receiver, comprising:
a first receiving stage to receive a first bit stream of I,Q symbols that have been further modulated with a first varying overlay modulation scheme, said first overlay modulation scheme comprising some combination of phase and amplitude shift;
a first overlay modulation detection stage to detect the value of the first overlay modulation shift as transmitted;
a second receiving stage to receive a second bit stream of I,Q symbols that have been further modulated with a second varying overlay modulation scheme, said second overlay modulation scheme comprising some combination of phase and amplitude shift;
a second overlay offset angle detection stage to detect the value of the second overlay modulation shift as transmitted; and
a maximal ratio combining stage that combines the first and second overlay bit streams using relative layer 2 modulation correction factors,
wherein said maximal ratio combining stage uses the following correction factors to the MRC weightings:

$C1=\sin(a1)/\sin(a2);$ and $C2=1.0;$ wherein C1 is the correction factor for the first overlay bit stream, C2 is the correction factor for the second overlay bit stream, a1 is a first offset angle as transmitted and a2 is a second offset angle as transmitted, and wherein a2>a1.

13. The receiver of claim 12, wherein the first and second overlay modulation schemes comprise an angular phase shift.

* * * * *